US011792151B2

(12) United States Patent
Panse et al.

(10) Patent No.: US 11,792,151 B2
(45) Date of Patent: Oct. 17, 2023

(54) DETECTION OF THREATS BASED ON RESPONSES TO NAME RESOLUTION REQUESTS

(71) Applicant: VMware, Inc., Palo Alto, CA (US)

(72) Inventors: Tejas Sanjeev Panse, San Jose, CA (US); Aditi Vutukuri, Atlanta, GA (US); Arnold Koon-Chee Poon, San Mateo, CA (US); Rajiv Mordani, Fremont, CA (US); Margaret Petrus, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/507,548

(22) Filed: Oct. 21, 2021

(65) Prior Publication Data
US 2023/0131894 A1    Apr. 27, 2023

(51) Int. Cl.
*H04L 61/10*        (2022.01)
*H04L 61/2521*      (2022.01)
(Continued)

(52) U.S. Cl.
CPC .......... *H04L 61/10* (2013.01); *H04L 61/2521* (2013.01); *H04L 61/2571* (2013.01); *H04L 61/5053* (2022.05)

(58) Field of Classification Search
None
See application file for complete search history.

(56) References Cited

U.S. PATENT DOCUMENTS 5,636,128 A     6/1997  Sugimoto et al.
7,027,411 B1    4/2006  Pulsipher et al.
                (Continued)

FOREIGN PATENT DOCUMENTS

EP      3716075 A1      9/2020
EP      3767553 A1      1/2021
                (Continued)

OTHER PUBLICATIONS

Abbes, Tarek, et al., "Detection of Firewall Configuration Errors with Updatable Tree," International Journal of Information Security, May 2015, 17 pages, vol. 15, No. 3, Springer Verlag.
(Continued)

*Primary Examiner* — Mohamed Ibrahim
(74) *Attorney, Agent, or Firm* — ADELI LLP

(57) ABSTRACT

Some embodiments provide a method for identifying security threats to a datacenter. The method receives flow attribute sets for multiple flows from multiple host computers in the datacenter on which data compute nodes (DCNs) execute. Each flow attribute set indicates at least a source DCN for the flow. The method identifies flow attribute sets that correspond to DCNs responding to name resolution requests. For each DCN of a set of DCNs executing on the host computers, the method determines whether the DCN has sent responses to name resolution requests in a manner that deviates from a historical baseline for the DCN based on the identified flow attribute sets. When a particular DCN has sent responses to name resolution requests in a manner that deviates from a historical baseline for the particular DCN, the method identifies the particular DCN as a security threat to the datacenter.

25 Claims, 9 Drawing Sheets

(51) Int. Cl.
  *H04L 61/5053* (2022.01)
  *H04L 61/256* (2022.01)

(56) References Cited

U.S. PATENT DOCUMENTS

| | | |
|---|---|---|
| 7,065,079 B1 | 6/2006 | Patra et al. |
| 7,580,356 B1 | 8/2009 | Mishra et al. |
| 7,739,211 B2 | 6/2010 | Coffman et al. |
| 7,908,655 B1 | 3/2011 | Bhattacharyya et al. |
| 3,005,945 A1 | 8/2011 | Cohen et al. |
| 8,359,652 B2 | 1/2013 | Bhagwan et al. |
| 8,495,429 B2 | 7/2013 | Fu et al. |
| 8,499,348 B1 | 7/2013 | Rubin |
| 8,605,655 B1 | 12/2013 | Sahai et al. |
| 8,762,957 B2 | 6/2014 | Cobb et al. |
| 9,166,997 B1 | 10/2015 | Guo et al. |
| 9,215,213 B2 | 12/2015 | Bansal et al. |
| 9,218,527 B2 | 12/2015 | Lakshminarayan et al. |
| 9,223,767 B1 | 12/2015 | Powell et al. |
| 9,438,560 B2 | 9/2016 | Mohanty et al. |
| 9,438,634 B1 | 9/2016 | Ross et al. |
| 9,454,444 B1 | 9/2016 | Agarwal et al. |
| 9,467,476 B1 | 10/2016 | Shieh et al. |
| 9,497,206 B2 | 11/2016 | Bernstein et al. |
| 9,578,050 B1 | 2/2017 | Barabash et al. |
| 9,680,877 B2 | 6/2017 | Duffield et al. |
| 9,699,049 B2 | 7/2017 | Gupta et al. |
| 9,767,197 B1 | 9/2017 | Agarwal et al. |
| 9,787,641 B2 | 10/2017 | Bansal et al. |
| 9,792,447 B2 | 10/2017 | Thota et al. |
| 9,882,713 B1 | 1/2018 | Raza et al. |
| 9,891,940 B2 | 2/2018 | Feroz et al. |
| 9,998,339 B1 | 6/2018 | Brajkovic et al. |
| 10,129,162 B1 | 11/2018 | Faulk, Jr. |
| 10,257,227 B1 | 4/2019 | Stickle et al. |
| 10,298,505 B1 | 5/2019 | Grant et al. |
| 10,298,619 B2 | 5/2019 | Nimmagadda et al. |
| 10,324,746 B2 | 6/2019 | Kumar et al. |
| 10,419,321 B2 | 9/2019 | Raman et al. |
| 10,425,437 B1 | 9/2019 | Bog et al. |
| 10,432,707 B2 | 10/2019 | Hosie et al. |
| 10,521,584 B1 | 12/2019 | Mehr |
| 10,735,282 B1 | 8/2020 | Singh et al. |
| 10,812,409 B2 | 10/2020 | Tiwary et al. |
| 10,911,335 B1 | 2/2021 | Mordani et al. |
| 11,057,414 B1 | 7/2021 | Giorgio et al. |
| 11,140,090 B2 | 10/2021 | Mordani et al. |
| 11,150,976 B1 | 10/2021 | Marwah et al. |
| 11,176,157 B2 | 11/2021 | Mordani et al. |
| 11,188,570 B2 | 11/2021 | Jain et al. |
| 11,288,256 B2 | 3/2022 | Jain et al. |
| 11,296,960 B2 | 4/2022 | Wang et al. |
| 11,321,213 B2 | 5/2022 | Gunda et al. |
| 11,340,931 B2 | 5/2022 | Krishna et al. |
| 11,343,262 B2 | 5/2022 | Junod et al. |
| 11,347,896 B1 | 5/2022 | Brown, Jr. et al. |
| 11,349,876 B2 | 5/2022 | Krishna et al. |
| 11,398,987 B2 | 7/2022 | Jain et al. |
| 11,436,075 B2 | 9/2022 | Jain et al. |
| 11,593,639 B1 | 2/2023 | Garg et al. |
| 2003/0120955 A1 | 6/2003 | Bartal et al. |
| 2003/0236677 A1 | 12/2003 | Casati et al. |
| 2004/0190724 A1 | 9/2004 | Dettinger et al. |
| 2005/0108444 A1 | 5/2005 | Flauaus et al. |
| 2005/0262554 A1 | 11/2005 | Brooks et al. |
| 2005/0289219 A1 | 12/2005 | Nazzal |
| 2006/0085785 A1 | 4/2006 | Garrett |
| 2006/0168657 A1 | 7/2006 | Baentsch et al. |
| 2006/0174337 A1 | 8/2006 | Bernoth |
| 2006/0239203 A1 | 10/2006 | Talpade et al. |
| 2007/0011734 A1 | 1/2007 | Balakrishnan et al. |
| 2007/0016666 A1 | 1/2007 | Duffield et al. |
| 2007/0058632 A1 | 3/2007 | Back et al. |
| 2008/0037423 A1 | 2/2008 | Singh et al. |
| 2008/0059596 A1 | 3/2008 | Ogawa |
| 2008/0196102 A1 | 8/2008 | Roesch |
| 2008/0196103 A1 | 8/2008 | Lin et al. |
| 2008/0263661 A1 | 10/2008 | Bouzida |
| 2008/0267186 A1 | 10/2008 | Boukis et al. |
| 2008/0281660 A1 | 11/2008 | Sajja et al. |
| 2008/0282335 A1 | 11/2008 | Abzarian et al. |
| 2009/0077663 A1 | 3/2009 | Sun et al. |
| 2009/0106228 A1 | 4/2009 | Weinman, Jr. |
| 2009/0300341 A1 | 12/2009 | Buehler et al. |
| 2010/0049968 A1 | 2/2010 | Dimitrakos et al. |
| 2010/0106764 A1 | 4/2010 | Chadwick et al. |
| 2010/0107085 A1 | 4/2010 | Chadwick et al. |
| 2010/0153316 A1 | 6/2010 | Duffield et al. |
| 2010/0211673 A1 | 8/2010 | Kosbab et al. |
| 2010/0241480 A1 | 9/2010 | Rokhlin et al. |
| 2010/0309812 A1 | 12/2010 | Marquez et al. |
| 2010/0325199 A1 | 12/2010 | Park et al. |
| 2010/0332262 A1 | 12/2010 | Horvitz et al. |
| 2011/0082962 A1 | 4/2011 | Horovitz et al. |
| 2011/0162039 A1* | 6/2011 | Trace ............... G06F 15/17306 726/1 |
| 2011/0170413 A1 | 7/2011 | Shi et al. |
| 2012/0131591 A1 | 5/2012 | Moorthi et al. |
| 2012/0226808 A1 | 9/2012 | Morgan |
| 2012/0266231 A1 | 10/2012 | Spiers et al. |
| 2013/0041522 A1 | 2/2013 | Mori et al. |
| 2013/0067090 A1 | 3/2013 | Batrouni et al. |
| 2013/0085914 A1* | 4/2013 | McPherson ......... H04L 63/0823 705/34 |
| 2013/0117567 A1 | 5/2013 | Chang et al. |
| 2013/0124753 A1 | 5/2013 | Ansari et al. |
| 2013/0185413 A1 | 7/2013 | Beaty et al. |
| 2013/0198459 A1 | 8/2013 | Joshi et al. |
| 2013/0212255 A1 | 8/2013 | Chao et al. |
| 2013/0227687 A1 | 8/2013 | Lee |
| 2013/0254766 A1 | 9/2013 | Zuo et al. |
| 2013/0297768 A1 | 11/2013 | Singh |
| 2014/0019964 A1 | 1/2014 | Neuse et al. |
| 2014/0089506 A1 | 3/2014 | Naga et al. |
| 2014/0207918 A1 | 7/2014 | Kowalski et al. |
| 2014/0230008 A1 | 8/2014 | Feroz et al. |
| 2014/0245423 A1 | 8/2014 | Lee |
| 2014/0282591 A1 | 9/2014 | Stich et al. |
| 2014/0310513 A1 | 10/2014 | Barney et al. |
| 2015/0113529 A1 | 4/2015 | Zhong |
| 2015/0124608 A1 | 5/2015 | Agarwal et al. |
| 2015/0135003 A1 | 5/2015 | Cota-Robles et al. |
| 2015/0180892 A1* | 6/2015 | Balderas ............. H04L 61/4511 726/22 |
| 2015/0181394 A1 | 6/2015 | Zuniga et al. |
| 2015/0281056 A1 | 10/2015 | Liljenstolpe |
| 2015/0281065 A1 | 10/2015 | Liljenstolpe |
| 2015/0286783 A1 | 10/2015 | Kumar et al. |
| 2015/0304349 A1 | 10/2015 | Bernstein et al. |
| 2015/0358391 A1 | 12/2015 | Moon et al. |
| 2016/0050589 A1 | 2/2016 | Safavi |
| 2016/0080404 A1 | 3/2016 | Kohout et al. |
| 2016/0087847 A1 | 3/2016 | Krithivas et al. |
| 2016/0087859 A1 | 3/2016 | Kuan et al. |
| 2016/0156591 A1 | 6/2016 | Zhou et al. |
| 2016/0191413 A1 | 6/2016 | Feroz et al. |
| 2016/0191463 A1 | 6/2016 | Mohanty et al. |
| 2016/0191521 A1 | 6/2016 | Feroz et al. |
| 2016/0216994 A1 | 7/2016 | Sefidcon et al. |
| 2016/0218951 A1 | 7/2016 | Masseur et al. |
| 2016/0294800 A1 | 10/2016 | Oppenheim, Jr. et al. |
| 2016/0294987 A1 | 10/2016 | Tian et al. |
| 2016/0301603 A1 | 10/2016 | Park et al. |
| 2016/0308898 A1 | 10/2016 | Teeple et al. |
| 2016/0350683 A1 | 12/2016 | Bester et al. |
| 2016/0352765 A1 | 12/2016 | Mermoud et al. |
| 2016/0359759 A1 | 12/2016 | Singh et al. |
| 2016/0380812 A1 | 12/2016 | Chanda et al. |
| 2016/0380884 A1 | 12/2016 | Sarikaya et al. |
| 2017/0005986 A1 | 1/2017 | Bansal et al. |
| 2017/0078168 A1 | 3/2017 | Harris et al. |
| 2017/0126677 A1 | 5/2017 | Kumar et al. |
| 2017/0134247 A1 | 5/2017 | Hoja et al. |
| 2017/0207968 A1 | 7/2017 | Eicken et al. |

(56) References Cited

U.S. PATENT DOCUMENTS

| | | |
|---|---|---|
| 2017/0212799 A1 | 7/2017 | Konireddygari |
| 2017/0214634 A1 | 7/2017 | Li |
| 2017/0223046 A1 | 8/2017 | Singh |
| 2017/0279687 A1 | 9/2017 | Muntés-Mulero et al. |
| 2017/0293994 A1 | 10/2017 | Li et al. |
| 2017/0324632 A1 | 11/2017 | Arora |
| 2017/0359217 A1 | 12/2017 | Ahuja et al. |
| 2017/0374102 A1 | 12/2017 | Woolward |
| 2017/0374106 A1 | 12/2017 | Hamou et al. |
| 2018/0007127 A1 | 1/2018 | Salapura et al. |
| 2018/0027080 A1 | 1/2018 | Yang et al. |
| 2018/0032399 A1 | 2/2018 | Johnson et al. |
| 2018/0034856 A1 | 2/2018 | Mallya |
| 2018/0041578 A1 | 2/2018 | Lee et al. |
| 2018/0048623 A1 | 2/2018 | Bansal et al. |
| 2018/0063164 A1 | 3/2018 | Balasubramanian et al. |
| 2018/0063178 A1 | 3/2018 | Jadhav et al. |
| 2018/0077119 A1 | 3/2018 | Fields et al. |
| 2018/0077120 A1* | 3/2018 | Baughman ............ H04L 67/563 |
| 2018/0077189 A1 | 3/2018 | Doppke et al. |
| 2018/0084034 A1 | 3/2018 | Netto et al. |
| 2018/0088964 A1 | 3/2018 | Hussain et al. |
| 2018/0101371 A1 | 4/2018 | Flanakin et al. |
| 2018/0123907 A1 | 5/2018 | Raman et al. |
| 2018/0123939 A1 | 5/2018 | Raman et al. |
| 2018/0145999 A1 | 5/2018 | Ertugrul et al. |
| 2018/0167405 A1 | 6/2018 | Comay et al. |
| 2018/0176102 A1 | 6/2018 | Bansal et al. |
| 2018/0176252 A1 | 6/2018 | Nimmagadda et al. |
| 2018/0176261 A1 | 6/2018 | Bansal et al. |
| 2018/0181423 A1 | 6/2018 | Gunda et al. |
| 2018/0181754 A1 | 6/2018 | Gunda |
| 2018/0183757 A1 | 6/2018 | Gunda et al. |
| 2018/0234333 A1 | 8/2018 | Inamdar et al. |
| 2018/0270189 A1* | 9/2018 | Montenot ............ H04L 63/0876 |
| 2018/0270308 A1 | 9/2018 | Shea et al. |
| 2018/0287876 A1 | 10/2018 | Strobel et al. |
| 2018/0288063 A1 | 10/2018 | Koottayi et al. |
| 2018/0316704 A1 | 11/2018 | Durairaj et al. |
| 2018/0324199 A1 | 11/2018 | Crotinger et al. |
| 2019/0007292 A1 | 1/2019 | Nevo et al. |
| 2019/0065739 A1 | 2/2019 | Manadhata et al. |
| 2019/0065762 A1 | 2/2019 | Kim et al. |
| 2019/0075056 A1 | 3/2019 | Lu et al. |
| 2019/0158520 A1 | 5/2019 | DiValentin et al. |
| 2019/0163900 A1 | 5/2019 | Zhang et al. |
| 2019/0166008 A1 | 5/2019 | Gintis et al. |
| 2019/0171474 A1 | 6/2019 | Malboubi et al. |
| 2019/0180141 A1 | 6/2019 | Tiagi et al. |
| 2019/0182276 A1 | 6/2019 | Tiagi et al. |
| 2019/0182281 A1 | 6/2019 | Neil et al. |
| 2019/0199599 A1 | 6/2019 | Zavesky et al. |
| 2019/0266004 A1 | 8/2019 | Kumar et al. |
| 2019/0280949 A1 | 9/2019 | Wang et al. |
| 2019/0303562 A1 | 10/2019 | Masputra et al. |
| 2019/0319863 A1 | 10/2019 | Gupta et al. |
| 2019/0342335 A1 | 11/2019 | Ni et al. |
| 2019/0373007 A1 | 12/2019 | Salunke et al. |
| 2019/0373052 A1 | 12/2019 | Pollitt et al. |
| 2019/0379612 A1 | 12/2019 | Tiwary et al. |
| 2019/0392329 A1 | 12/2019 | Rangarajan et al. |
| 2020/0028756 A1 | 1/2020 | Hale et al. |
| 2020/0084087 A1 | 3/2020 | Sharma et al. |
| 2020/0100145 A1 | 3/2020 | Enqvist et al. |
| 2020/0162407 A1 | 5/2020 | Tillotson |
| 2020/0167784 A1 | 5/2020 | Kursun |
| 2020/0183947 A1 | 6/2020 | Reeve et al. |
| 2020/0210260 A1 | 7/2020 | Prabhakar et al. |
| 2020/0244676 A1 | 7/2020 | Amit et al. |
| 2020/0310884 A1 | 10/2020 | Villalobos et al. |
| 2020/0396075 A1 | 12/2020 | Visegrady et al. |
| 2020/0396254 A1 | 12/2020 | Crabtree et al. |
| 2021/0006642 A1 | 1/2021 | He et al. |
| 2021/0026677 A1 | 1/2021 | Krishna et al. |
| 2021/0026720 A1 | 1/2021 | Jain et al. |
| 2021/0026830 A1 | 1/2021 | Jain et al. |
| 2021/0026863 A1 | 1/2021 | Mordani et al. |
| 2021/0026870 A1 | 1/2021 | Jain et al. |
| 2021/0028996 A1 | 1/2021 | Mordani et al. |
| 2021/0029002 A1 | 1/2021 | Mordani et al. |
| 2021/0029050 A1 | 1/2021 | Jain et al. |
| 2021/0029051 A1 | 1/2021 | Mordani et al. |
| 2021/0029166 A1 | 1/2021 | Krishna et al. |
| 2021/0075789 A1 | 3/2021 | Wen et al. |
| 2021/0084074 A1 | 3/2021 | Kimer et al. |
| 2021/0099473 A1 | 4/2021 | Fainberg et al. |
| 2021/0110407 A1 | 4/2021 | Albero et al. |
| 2021/0185073 A1 | 6/2021 | Ewaida et al. |
| 2021/0203684 A1 | 7/2021 | Maor et al. |
| 2021/0224179 A1 | 7/2021 | Gunda et al. |
| 2021/0281591 A1 | 9/2021 | Furtak |
| 2021/0344689 A1 | 11/2021 | Mehr |
| 2022/0014560 A1 | 1/2022 | Crabtree et al. |
| 2022/0239675 A1 | 7/2022 | Panse et al. |
| 2022/0239683 A1 | 7/2022 | Kaliya et al. |
| 2022/0261330 A1 | 8/2022 | Gunda et al. |
| 2022/0269577 A1 | 8/2022 | Gechman et al. |
| 2022/0365806 A1 | 11/2022 | Krishna et al. |
| 2022/0417096 A1 | 12/2022 | Vutukur et al. |
| 2023/0011043 A1 | 1/2023 | Panse et al. |
| 2023/0011397 A1 | 1/2023 | Panse et al. |
| 2023/0011957 A1 | 1/2023 | Panse et al. |

FOREIGN PATENT DOCUMENTS

| | | |
|---|---|---|
| WO | 2006091175 A1 | 8/2006 |
| WO | 2016003262 A1 | 1/2016 |

OTHER PUBLICATIONS

El-Atawy, Adel, et al., "Policy Segmentation for Intelligent Firewall Testing," 1st IEEE ICNP Workshop on Secure Network Protocols, Nov. 6, 2005, 6 pages, IEEE, Boston, MA, USA.

Non-Published Commonly Owned U.S. Appl. No. 17/220,550, filed Apr. 1, 2021, 54 pages, VMware, Inc.

Non-Published Commonly Owned U.S. Appl. No. 17/220,553, filed Apr. 1, 2021, 55 pages, VMware, Inc.

Mon-Published Commonly Owned U.S. Appl. No. 17/355,829, filed Jun. 23, 2021, 44 pages, VMware, Inc.

Non-Published Commonly Owned U.S. Appl. No. 17/372,264, filed Jul. 9, 2021, 52 pages, VMware, Inc.

Non-Published Commonly Owned U.S. Appl. No. 17/372,268, filed Jul. 9, 2021, 53 pages, VMware, Inc.

Non-Published Commonly Owned U.S. Appl. No. 17/372,271, filed Jul. 9, 2021, 53 pages, VMware, Inc.

Oliveira, Ricardo M., et al., "Automatic Detection of Firewall Misconfigurations Using Firewall and Network Routing Policies," Jan. 2009, 6 pages.

Ring, Markus, et al., "Detection of Slow Port Scans in Flow-Based Network Traffic," PLOS ONE, Sep. 25, 2018, 18 pages, retrieved from https://journals.plos.org/plosone/article?id=10.1371/journal.pone.0204507.

Turcotte, Melissa J. M., et al., "Unified Host and Network Data Set", Aug. 24, 2017, 16 pages, arXiv:1708.07518v1, arXiv.org, Cornell University, Ithaca, NY, USA.

Waye, Lucas, et al., "Cryptographically Secure Information Flow Control on Key-Value Stores," CCS '17 Proceedings of the 2017 ACM SIGSAC Conference on Computer and Communications Security, Oct. 30-Nov. 3, 2017, 15 pages, ACM, Dallas, TX, USA.

Arbuthnot, Tom, "What are Thresholds for Good and Poor Network Packet Loss, Jitter and Round Trip Time for Unified Communications?", Tom Talks, May 17, 2018, 7 pages, retrieved from https://tomtalks.blog/what-are-thresholds-for-good-and-poor-network-packet-loss-jitter-and-round-trip-time-for-unified-communications/.

* cited by examiner

DETECTION OF THREATS BASED ON RESPONSES TO NAME RESOLUTION REQUESTS

BACKGROUND

In many datacenters, name resolution protocols such as Link-Local Multicast Name Resolution (LLMNR) and NetBIOS Name Service (NBT-NS) serve as alternate protocols for host identification (e.g., when domain name system (DNS) server is unable to resolve a host name. However, these protocols can be exploited within a datacenter network. When a first VM needs to send a name resolution request to its local network neighbors, the first VM sends this as a multicast message to these neighbors. If one of the neighboring VMs is compromised, that VM can respond with an incorrect address for the requested name (e.g., the IP address of the compromised VM), thereby causing the first VM to provide authentication information to the compromised VM. As such, techniques to automatically detect these compromised VMs are important.

BRIEF SUMMARY

Some embodiments provide an analysis appliance that automatically detects security threats (e.g., compromised data compute nodes (DCNs)) in a datacenter based on analysis of name resolution responses in the datacenter. The analysis appliance of some embodiments receives flow attribute sets from host computers in the datacenter (on which the DCNs execute) and identifies flow attribute sets that correspond to DCNs responding to name resolution requests. For each DCN of at least of a set of DCNs in the datacenter, the analysis appliance analyzes the name resolution responses sent by the DCN to determine a likelihood that the DCN has been compromised and is maliciously responding to these name resolution requests in order to gain authentication information of other DCNs in the datacenter. When a DCN is suspected to have been compromised, the analysis appliance can initiate remediation actions (e.g., quarantine, etc.) of the compromised DCN.

To detect these compromised DCNs, some embodiments leverage a data flow collection system for the datacenter that collects and reports attributes of data flows associated with the DCNs executing in the datacenter (e.g., virtual machines (VMs), containers, bare metal computing devices, etc.). Agents on host computers (or operating directly on bare metal computing devices) collect and export data flow information for the data compute nodes (DCNs) to the analysis appliance (which may operate, e.g., as a single server or cluster of servers). Agents on the host computers (e.g., different agents than those that export the data flow information) also export context information to the analysis appliance.

The analysis appliance, in some embodiments, includes multiple detectors that analyze the flow and/or context information to identify anomalous events. One such detector examines flows to identify name resolution requests and corresponding responses and then uses these responses to determine which DCNs might be compromised. Each of the flow attribute sets received by the analysis appliance indicates a source of the flow as well as network address, transport layer port, and transport layer protocol information that can be used to identify name resolution requests and responses. For instance, LLMNR and NBT-NS traffic use specific destination network addresses (e.g., multicast addresses) and user datagram protocol (UDP) port numbers for the name resolution requests, and responses can be correlated with these requests using similar flow attributes.

In different embodiments, the detector then uses various different techniques to identify compromised DCNs. For instance, in some embodiments the detector analyzes each of the DCNs in the datacenter (or a subset of these DCNs) at a predetermined interval (e.g., every 10 minutes, every 30 minutes, every 2 hours, etc.). The analysis for a particular DCN, in some embodiments, compares the name resolution responses sent by the particular DCN during a recent time period (e.g., the current day up to that point) to a historical baseline (e.g., the last 30 days) for the particular DCN to determine whether the particular DCN is responding to name resolution requests in a manner that deviates from the historical baseline. This deviation can be measured with one or more different metrics, and if the deviation is indicative of the particular DCN likely being compromised, then remediation actions may be initiated by the analysis appliance.

In some embodiments, the detector computes historical baseline metrics each day, each hour, etc., depending on the time periods used for the baseline metrics. For instance, a 30-day average can be computed once per day. The different metrics, in some embodiments, include one or more of (i) the number of name resolution responses sent per time period (e.g., per day), (ii) the ratio of name resolution responses sent to name resolution requests received, (iii) the number of unique DCNs to which a particular DCN sends name resolution responses per time period, (iv) whether a particular DCN sends name resolution responses to requesting DCNs that are not on a list of DCNs to which the particular DCN sent name resolution responses during the baseline time period, and (v) whether a particular DCN sends name resolution responses for new names that are not on a list of names for which the particular DCN sent names during the baseline period. In some embodiments, the detector may also incorporate additional information about a particular DCN to analyze whether that particular DCN is likely compromised (e.g., whether the particular DCN has other anomalous outgoing connections).

In some embodiments, the detector assigns a score to each DCN that is analyzed (e.g., based on one or more of the above criteria), with DCNs that score above a threshold value being identified as likely being compromised. Some embodiments then initiate remediation actions against these compromised DCNs, with higher scores resulting in more aggressive actions. For instance, for a first tier of potential threats, the analysis appliance generates (or instructs a network management and control system to generate) a firewall rule that prevents the DCNs from receiving name resolution requests. For a higher-scoring second tier of such threats, the analysis appliance more fully quarantines the DCNs by, e.g., preventing the DCNs from sending and/or receiving any network traffic or setting up any network connections.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide an analysis appliance that automatically detects security threats (e.g., compromised data compute nodes (DCNs)) in a datacenter based on analysis of name resolution responses in the datacenter. The analysis appliance of some embodiments receives flow attribute sets from host computers in the datacenter (on which the DCNs execute) and identifies flow attribute sets that correspond to DCNs responding to name resolution requests. For each DCN of at least of a set of DCNs in the datacenter, the analysis appliance analyzes the name resolution responses sent by the DCN to determine a likelihood that the DCN has been compromised and is maliciously responding to these name resolution requests in order to gain authentication information of other DCNs in the datacenter. When a DCN is suspected to have been compromised, the analysis appliance can initiate remediation actions (e.g., quarantine, etc.) of the compromised DCN.

To detect these compromised DCNs, some embodiments leverage a data flow collection system for the datacenter that collects and reports attributes of data flows associated with the DCNs executing in the datacenter (e.g., virtual machines (VMs), containers, bare metal computing devices, etc.). Agents on host computers (or operating directly on bare metal computing devices) collect and export data flow information for the data compute nodes (DCNs) to the analysis appliance (which may operate, e.g., as a single server or cluster of servers). Agents on the host computers (e.g., different agents than those that export the data flow information) also export context information to the analysis appliance.

Figure 1:
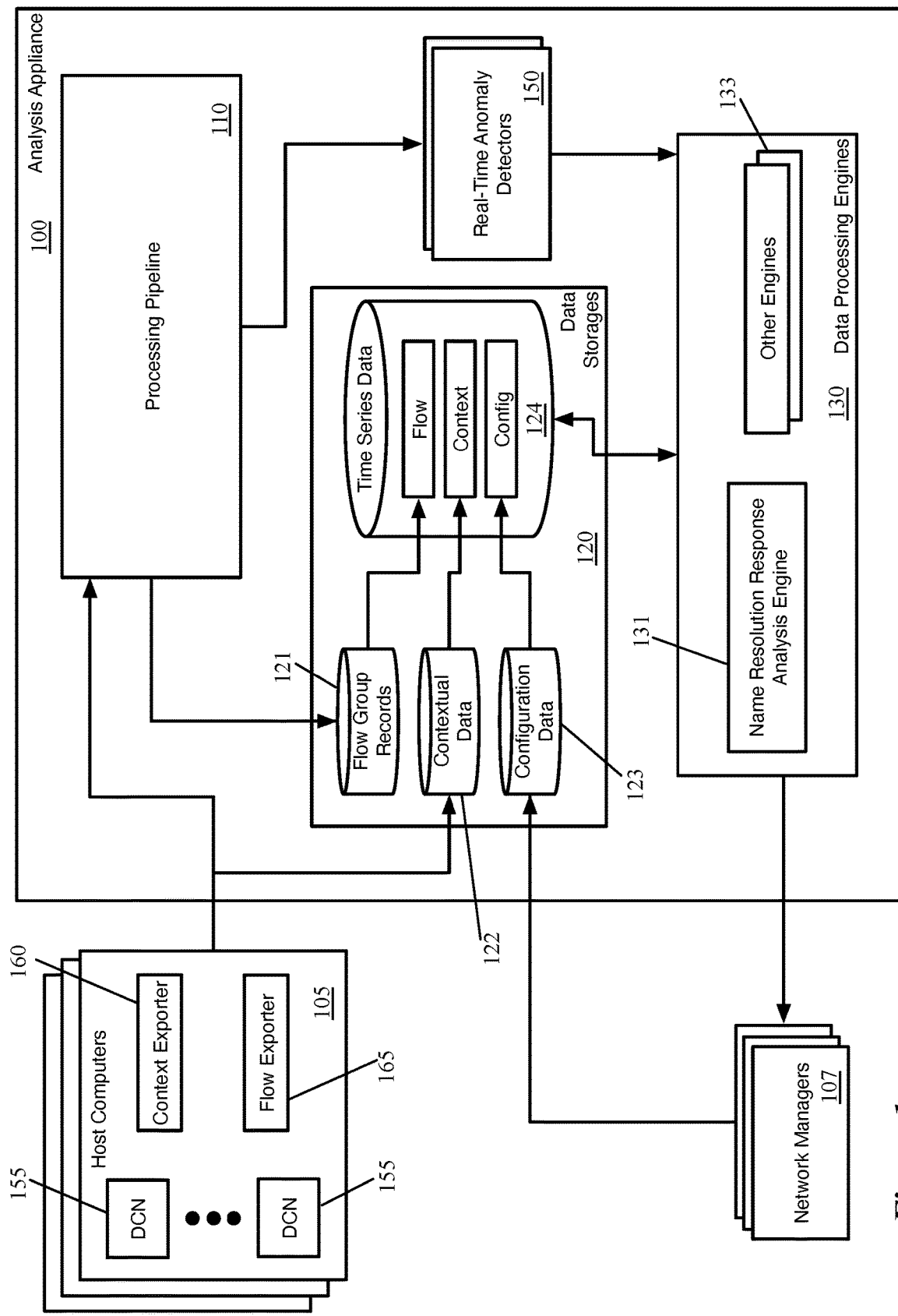
FIG. 1 conceptually illustrates an analysis appliance of some embodiments.

FIG. 1 conceptually illustrates the analysis appliance 100 of some embodiments, as well as the network managers 107 and host computers 105. The analysis appliance 100 includes a processing pipeline 110 for flow data (e.g., flow attribute sets received from host computers), a set of data storages 120 for storing received data, a set of real-time anomaly detectors 150 for performing regular anomaly detection on incoming flow data from the processing pipeline 110, and a set of data processing engines 130 (e.g., a visualization engine 131, a name resolution response analysis engine 132, and other engines 133).

The host computers 105 will be described in greater detail below by reference to FIG. 2. As shown, these host computers execute one or more DCNs 155 (e.g., virtual machines (VMs), containers, etc.) that can run services, applications, etc. These DCNs 155 send and receive data traffic, which are organized as data message flows. Each host computer 105 also executes (e.g., within virtualization software) a context exporter 160 and a flow exporter 165, which are associated with the analysis appliance 100. The context exporter 160 collects context data regarding the DCNs 155 and provides this data to the analysis appliance 100. The flow exporter 165 collects information about data flows to and from the DCNs 155 and provides this data to the analysis appliance 100.

The network managers 107 provide configuration data to the analysis appliance 100, including management plane configuration data and policy configuration data. In addition, the analysis appliance 100 communicates control messages (e.g., updates to service rule policies, updated keys, updated group memberships validated by a user, etc.) through the network managers 107. In some embodiments, a user (e.g., an administrator, not shown) can interact with the analysis appliance 100 directly (e.g., to provide commands to the visualization engine 131).

The processing pipeline 110, in some embodiments, processes flow data (e.g., flow attribute sets, also referred to as flow group records) received from the host computers in the system for analysis by other elements of the appliance (e.g., the anomaly detector 150). When two DCNs 155 within the datacenter communicate with each other and their respective host computers 105, both provide flow attribute sets for the flow to the analysis appliance 100. The processing pipeline 110 deduplicates these flow attribute sets (i.e., into a single flow attribute set). This deduplication process matches these flows (e.g., based on flow keys) and, in some embodiments, generates a new flow attribute set for the data flow that includes all unique attributes from both the source and destination host computer flow attribute sets. The processing pipeline 110 stores these flow attribute sets in the data storages 120 (e.g., the flow group records 121). In some embodiments, in addition to deduplication, the processing pipeline 110 also identifies and groups corresponding flow attribute sets (e.g., for reverse direction flows, or otherwise-related flows). These flow attribute sets are also combined and stored in, e.g., the flow group records 121.

The processing pipeline 110 of some embodiments also fills in missing information for flow attribute sets, if needed (e.g., DCN identifiers for remote DCNs, etc.) using other flow attribute sets or other information (e.g., by matching DCN identifiers to network addresses already present in the flow attribute sets). Correlation of flow attribute sets can again be performed after this missing information is filled in. Additional description of the processing pipeline 110 is found in U.S. patent application Ser. No. 16/520,220, now issued as U.S. Pat. No. 11,398,897, which is incorporated herein by reference.

The data storages 120 include, in some embodiments, a data storage for each different type of data received (e.g., a correlated flow group record data storage 121, a contextual attribute data storage 122, a configuration data storage 123, and a time series data storage 124). The contextual attribute data storage 122, in some embodiments, stores received contextual attribute data from multiple host computers and uses that data for populating the time series data storage 124 with contextual attribute data (e.g., in a contextual attribute topic). In some embodiments, the contextual attribute data storage 122 is used in correlating contextual attributes with flow group records for display. The time series data storage 124 is used additionally, or alternatively, in other embodiments, for correlating contextual attribute data to flow group record data.

The contextual attribute data storage 122, in some embodiments, receives contextual attribute data sets including any, or all, of: data regarding guest metadata, guest events, and guest DCN metrics. In some embodiments, the guest metadata includes any or all of DCN details (a universally unique identifier [uuid], a bios uuid and a vmxpath), operating system details (type of OS and version information), and process details (e.g., process ID, creation time, hash, name, command line, security ID [sid], user ID [uid], loaded library or module information, process metrics [e.g., memory usage and CPU usage], process version, parent process ID, etc.). Guest events, in some embodiments, include DCN events (e.g., power on and power off), user login events (e.g., login, logoff, connect, and disconnect events, a session ID, a timestamp, a DCN IP, and a connected client IP), and service process events (e.g., event type [e.g., listen start, listen stop], timestamp, destination DCN IP, destination port number, and process details). Guest DCN metrics, in some embodiments, include memory usage and CPU usage. It should be understood that many additional pieces of information may be provided to a contextual attribute data storage and that the partial list above serves only as an example.

In some embodiments, the set of data storages 120 includes a flow group record data storage 121. In some embodiments, this data storage 121 stores flow attribute sets after aggregation and correlation with configuration data stored in the configuration data storage 123. The flow group record data storage 121, in some embodiments, also stores learned pairings of IP addresses and DCN identifiers. In some embodiments, the learning is based on previously processed flow record groups. The correlated flow group record data storage 121, in some embodiments, provides processed (e.g., aggregated and correlated) flow group records to the time series data storage.

The configuration data storage 123, in some embodiments, receives configuration data (e.g., management plane configuration and/or policy configuration) from a network manager controller. The management plane configuration data includes information relating to group membership (in terms of DCN), and the policy configuration data sets include information about service rules (e.g., firewall rules), in some embodiments. The service rules, in some embodiments, are expressed in terms of any of IP addresses, ports, protocols, groups, etc., in any combination. In some embodiments, an initial set of configuration data is sent at startup or reboot of either the network manager computer or the analysis appliance, while subsequent configuration data sets include only changes to the last configuration data set.

A time series data storage 124, in some embodiments, stores flow group records, configuration data, and context data. In some embodiments, the time series data storage 124 is organized by topic with each different type of data stored in a different topic. Additionally, in some embodiments, each topic is organized in a time series fashion by use of an index that is appended to each set of data and is coordinated among all the producers of data for the topic. The time series data storage 124 is organized at multiple levels of temporal granularity, in some embodiments. In some embodiments, the different levels of granularity include some combination of hourly, daily, weekly, and monthly. The different levels of temporal granularity are used, in some embodiments, for data collected for a previous 24 hours (e.g., organized on an hourly basis), data for a previous 6 days (e.g., organized on a daily basis), data for a previous 30 days (e.g., organized on a daily or weekly basis), and data received more than 30 days earlier (e.g., organized on a monthly basis). The data organized based on the various levels of temporal granularity are, in some embodiments, periodically (e.g., daily, hourly, etc.) rolled up into the next level of granularity.

Real-time (or near-real-time) anomaly detectors 150, in some embodiments, analyze the correlated flow attribute sets as this flow information is received and correlated by the processing pipeline 110 (as opposed to retrieving data from the storages 120). In some embodiments, the processing pipeline 110 provides the flow information (possibly also correlated to contextual attribute information) to the real-time anomaly detectors 150 as batches of flow attribute sets are correlated and processed. These anomaly detectors 150 detect various types of anomalies (e.g., port sweeps, suspicious network connections, etc.) and store records of each detected anomalous event in an anomaly storage (e.g., a database, not shown in the figure). In some embodiments, each record of an anomalous event indicates at least a start and end time for the event, one or more associated DCNs, and a description of the event. The anomaly detectors 150 also provide at least a subset of the anomalous event records (e.g., records for particular types of anomalous events) directly to the data processing engines 150.

The data processing engines 130 include a name resolution response analysis engine 131 and a set of other engines 133. In some embodiments, these various data processing engines 130 analyze the time series data 124 at regular intervals (e.g., every 10 minutes, every 30 minutes, every hour, etc.) to perform various types of analysis for the datacenter (e.g., to detect various types of anomalous events in the datacenter network). For instance, anomaly detectors might look for anomalous amounts of dropped traffic, the presence of malicious files on a DCN, vertical port scans, password and/or hash collection taking place on a DCN, etc. The name resolution response analysis engine 131 is one example of such an anomaly detector in some embodiments. As described in detail below, the name resolution response analysis engine 131 identifies flow attribute sets representing name resolution response flows within the datacenter and analyzes these flows to determine whether any DCNs appear to be compromised (and are therefore using the response flows to attempt to gain authentication information from benign DCNs in the datacenter.

The other engines 133 perform various other tasks, including generation of a graphical user interface through which an administrator can interact with and control the analysis appliance 100 and additional processing of anomalous events. The graphical user interface of some embodiments provides information about DCNs, flows, contextual attributes, anomalous events, etc. The name resolution response analysis engine 131 as well as some of the other engines 133 can also initiate communication with the network managers 107 in some embodiments (e.g., to specify firewall rules that should be configured in the datacenter network). Additional information about the analysis appliance 100 can be found in U.S. Patent Publication 2021/0029050, which is incorporated by reference herein.

Figure 2:
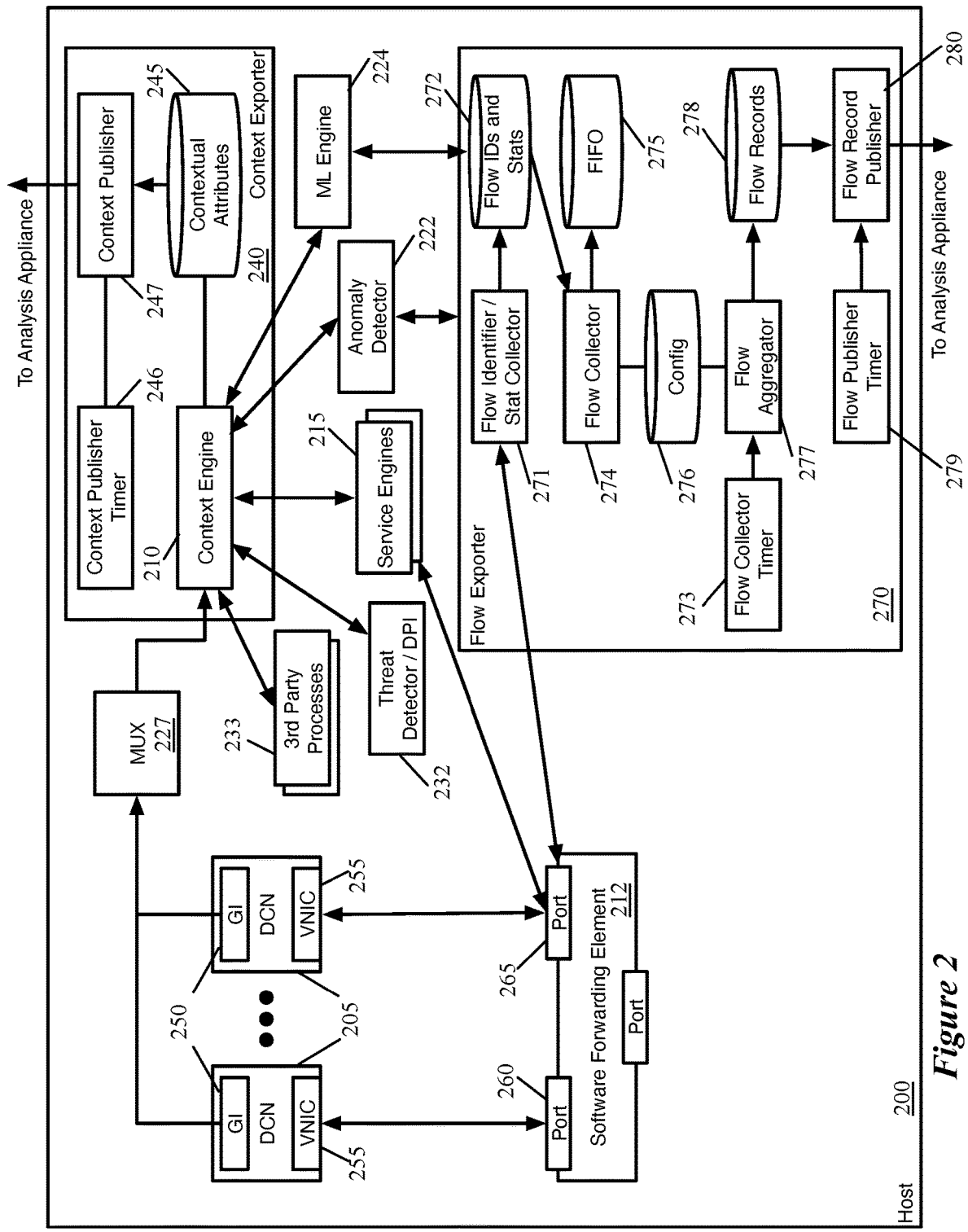
FIG. 2 conceptually illustrates a host computer of some embodiments.

FIG. 2 conceptually illustrates a host computer 200 (e.g., one of the host computers 105) of some embodiments in more detail, specifically focusing on the context exporter 240 and flow exporter 270 that collect, aggregate, and publish aggregated data to the analysis appliance. As shown, the host computer 200 also executes several data compute nodes (DCNs) 205, a set of service engines 215, a threat detector/deep packet inspection (DPI) module 232, a set of third-party processes 233, a MUX (multiplexer) 227, an anomaly detector 222, a machine learning (ML) engine 224, and a software forwarding element 212.

Guest introspection agents 250 execute on the DCNs 205 and extract context data from the DCNs 205. For example, a guest introspection agent 250, in some embodiments, detects that a new data flow has been initiated (e.g., by sending a SYN packet in a data flow using TCP) and collects introspection data (e.g., a set of attributes of the data flow and DCN). The introspection data, in some embodiments, includes any, or all, of data regarding (i) guest metadata, (ii) guest events, and (iii) guest DCN metrics. In some embodiments, the guest metadata includes any, or all, of data regarding DCN 205 (a universally unique identifier [uuid], a bios uuid, and a vmxpath), operating system data (type of OS and version information), and process data (e.g., process ID, creation time, hash, name, command line, security ID [sid], user ID [uid], loaded library or module information, process metrics [e.g., memory usage and CPU usage], process version, parent process ID, etc.). Guest events, in some embodiments, include DCN events (e.g., power on and power off), user login events (e.g., login, logoff, connect, and disconnect events, a session ID, a timestamp, a DCN IP, and a connected client IP), and service process events (e.g., event type [e.g., listen start, listen stop], timestamp, destination DCN IP, destination port number, and process details). Guest DCN metrics, in some embodiments, include memory usage and CPU usage. It should be understood that much of the context data, in some embodiments, is not included in L2-L7 headers of a flow and that many additional pieces of information may be collected by guest introspection agent 250. The partial list above serves only as an example of the types of information that can be gathered by guest introspection agent 250.

In some embodiments, the guest introspection agents 250 send the collected context information to the context exporter 240 (specifically to the context engine 210) through a multiplexer 227. The context exporter 240 includes the context engine 210, a contextual attribute storage 245, a context publisher timer 246, and a context publisher 247. The context exporter 240 processes context data (e.g., contextual attribute data sets) at the host computer 200 and publishes the context data to the analysis appliance. The context engine 210 also provides the received context information to other elements operating in the host computer 200 and correlates this context data with context data received from other sources.

In some embodiments, the other sources include the set of service engines 215, the threat detector/DPI module 232, third-party software (processes) 233, the anomaly detector 222, and the ML engine 224. The context engine 210, in some embodiments, correlates the context data from the multiple sources for providing the correlated context data (e.g., sets of correlated contextual attributes) to the context publisher 247 (e.g., through context attribute storage 245).

As shown, each DCN 205 also includes a virtual network interface controller (VNIC) 255 in some embodiments. Each VNIC is responsible for exchanging messages between its respective DCN and the SFE 212 (which may be, e.g., a virtual switch or a set of virtual switches). Each VNIC 255 connects to a particular port 260-265 of the SFE 212. The SFE 212 also connects to a physical network interface controller (PNIC) (not shown) of the host. In some embodiments, the VNICs are software abstractions of one or more physical NICs (PNICs) of the host created by the virtualization software of the host (within which the software forwarding element 212 executes).

In some embodiments, the SFE 212 maintains a single port 260-265 for each VNIC of each DCN. The SFE 212 connects to the host PNIC (through a NIC driver [not shown]) to send outgoing messages and to receive incoming messages. In some embodiments, the SFE 212 is defined to include one or more ports that connect to the PNIC driver to send and receive messages to and from the PNIC. The SFE 212 performs message-processing operations to forward messages that it receives on one of its ports to another one of its ports. For example, in some embodiments, the SFE 212 tries to use data in the message (e.g., data in the message header) to match a message to flow-based rules, and upon finding a match, to perform the action specified by the matching rule (e.g., to hand the message to one of its ports, which directs the message to be supplied to a destination DCN or to the PNIC).

In some embodiments, the SFE 212 is a software switch (e.g., a virtual switch), while in other embodiments it is a software router or a combined software switch/router, and may represent multiple SFEs (e.g., a combination of virtual switches and virtual routers). The SFE 212, in some embodiments, implements one or more logical forwarding elements (e.g., logical switches or logical routers) with SFEs 212 executing on other hosts in a multi-host environment. A logical forwarding element, in some embodiments, can span multiple hosts to connect DCNs that execute on different hosts but belong to one logical network. Different logical forwarding elements can be defined to specify different logical networks for different users, and each logical forwarding element can be defined by multiple software forwarding elements on multiple hosts. Each logical forwarding element isolates the traffic of the DCNs of one logical network from the DCNs of another logical network that is serviced by another logical forwarding element. A logical forwarding element can connect DCNs executing on the same host and/or different hosts, both within a datacenter and across datacenters. In some embodiments, the SFE 212 extracts from a data message a logical network identifier (e.g., a VNI) and a MAC address. The SFE 212, in such embodiments, uses the extracted VNI to identify a logical port group or logical switch, and then uses the MAC address to identify a port within the port group or logical switch.

The ports of the SFE 212, in some embodiments, include one or more function calls to one or more modules that implement special input/output (I/O) operations on incoming and outgoing messages that are received at the ports 260-265. Examples of I/O operations that are implemented by the ports 260-265 include ARP broadcast suppression operations and DHCP broadcast suppression operations, as described in U.S. Pat. No. 9,548,965. Other I/O operations (such as firewall operations, load-balancing operations, network address translation operations, etc.) can be so implemented in some embodiments of the invention. By implementing a stack of such function calls, the ports 260-265 can implement a chain of I/O operations on incoming and/or outgoing messages in some embodiments. Also, in some embodiments, other modules in the data path (such as the VNICs 255 and the ports 260-265, etc.) implement the I/O function call operations instead of, or in conjunction with, the ports 260-265. In some embodiments, one or more of the function calls made by the SFE ports 260-265 can be to service engines 215, which query the context engine 210 for context information that the service engines 215 use (e.g., to generate context headers that include context used in providing a service and to identify service rules applied to provide the service). In some embodiments, the generated context headers are then provided through the port 260-265 of SFE 212 to flow exporter 270 (e.g., flow identifier and statistics collector 271).

The service engines 215 can include a distributed firewall engine of some embodiments that implements distributed firewall rules configured for the datacenter network. These distributed firewall rules are, in some embodiments, defined in terms of rule identifiers, and specify whether to drop or allow traffic from one group of DCNs to another group of DCNs. The firewall rules can be specified in terms of source and destination network addresses (e.g., IP and/or MAC addresses) and/or security groups (which are converted to network addresses). For instance, a firewall rule might be defined at the network manager level as allowing any traffic from a set of web server VMs running the Linux operating system (a first security group) to a set of database server VMs running the Windows operating system (a second security group). This firewall rule is then translated into a set of more specific rules based on the membership of the DCNs in the first and second security groups using the IP and/or MAC addresses of these DCNs.

The flow exporter 270 monitors flows, collects flow data and statistics, aggregates flow data into flow group records, and publishes flow attribute sets (also referred to as flow group records) for consumption by the analysis appliance. In some embodiments, the flow exporter 270 generally aggregates statistics for individual flows identified during multiple time periods, and for each time period identifies multiple groups of flows with each group including one or more individual flows. For each identified flow group, the flow exporter 270 identifies a set of attributes by aggregating one or more subsets of attributes of one or more individual flows in the group as described below in greater detail. In some embodiments, the subset of attributes of each individual flow in each group is the aggregated statistics of the individual flow. After the multiple time periods, flow exporter 270 provides the set of attributes for each group identified in the multiple time periods to the analysis appliance for further analysis of the identified flows.

As shown, the flow exporter 270 includes a flow identifier/statistics collector 271, a flow identifier and statistics storage 272, a flow collector timer 273, a flow collector 274, a first-in first-out (FIFO) storage 275, a configuration data storage 276, a flow aggregator 277, a flow group record storage 278, a flow publisher timer 279, and a flow group record publisher 280. These modules collectively collect and process flow data to produce and publish flow attribute sets.

The flow exporter 270 receives flow information, including flow identifiers and statistics, at the flow identifier/statistics collector 271. In some embodiments, the received flow information is derived from individual data messages that make up the flow and includes context data used in making service decisions at service engines 215. In some embodiments, the flow information also specifies which firewall rules are applied to each flow (e.g., using firewall rule identifiers). The flow exporter 270 stores the received information associated with particular flows in the flow identifier and statistics storage 272. The statistics, in some embodiments, are summarized (accumulated) over the life of the particular flow (e.g., bytes exchanged, number of packets, start time, and duration of the flow).

The flow collector 274, in some embodiments, monitors the flows to determine which flows have terminated (e.g., timeouts, FIN packets, RST packets, etc.) and collects the flow identifiers and statistics and pushes the collected data to FIFO storage 275. In some embodiments, the flow collector 274 collects additional configuration data from configuration data storage 276 and includes this additional configuration data with the data collected from flow identifier and statistics storage 272 before sending the data to FIFO storage 275.

Additionally, the flow collector 274, in some embodiments, collects data for long-lived active flows (e.g., flows lasting longer than half a publishing period) from the flow identifier and statistics storage 272 before the end of a publishing period provided by flow publisher timer 279. In some embodiments, the data collected for a long-lived active flow is different from the data collected for terminated flows. For example, active flows are reported using a start time but without a duration in some embodiments. Some embodiments also include flows that are initiated but dropped/blocked based on firewall rules.

Only flows meeting certain criteria are collected by the flow collector 274 in some embodiments. For example, only information for flows using a pre-specified set of transport layer protocols (e.g., TCP, UDP, ESP, GRE, SCTP) are collected, while others are dropped or ignored. In some embodiments, additional types of traffic, such as broadcast and multicast, safety check (e.g., having ruleID=0 or 0 rx and tx byte/packet counts), L2 flows, flows which are not classified as one of (i) inactive, (ii) drop, or (iii) reject, are dropped (i.e., not collected or not placed into FIFO storage 275).

In some embodiments, the FIFO storage 275 is a circular or ring buffer such that only a certain number of sets of flow identifiers and flow statistics can be stored before old sets are overwritten. In order to collect all the data placed into FIFO storage 275, or at least to not miss too much (e.g., miss less than 5% of the data flows), the flow aggregator 277 pulls data stored in FIFO storage 275 based on a flow collection timer 273 and aggregates the pulled data into aggregated flow group records. Some embodiments pull data from the FIFO storage 275 based on a configurable periodicity (e.g., every 10 seconds), while other embodiments, alternatively or in addition to the periodic collection, dynamically determine when to collect data from FIFO storage 275 based on a detected number of data flows (e.g., terminated data flows, a total number of active data flows, etc.) and the size of FIFO storage 275. Each set of flow data pulled from FIFO storage 275 for a particular flow, in some embodiments, represents a unidirectional flow from a first endpoint (e.g., machine or DCN) to a second endpoint. If the first and second endpoints both execute on the same host computer 200, in some embodiments, a same unidirectional flow is captured at different ports 260-265 of the software forwarding element 212. To avoid double counting a same data message provided to the flow identifier 271 from the two ports 260-265, the flow identifier 271 uses a sequence number or other unique identifier to determine if the data message has been accounted for in the statistics collected for the flow. Even if duplicate data messages for a single unidirectional flow have been accounted for, the flow aggregator 277 additionally combines sets of flow data received for the separate unidirectional flows into a single set of flow data in some embodiments. This deduplication (deduping) of flow data occurs before further aggregation in some embodiments and, in other embodiments, occurs after an aggregation operation.

The flow aggregator 277, in some embodiments, receives a set of keys from the analysis appliance through the network manager computer that specify how the flow data sets are aggregated. After aggregating the flows, the flow aggregator 277 performs a deduplication process to combine aggregated flow group records for two unidirectional flows between two DCNs 205 executing on host machine 200 into a single aggregated flow group record and stores the aggregated records in flow group record storage 278. From flow group record storage 278, flow group record publisher 280 publishes the aggregated flow group records to an analysis appliance according to a configurable timing provided by flow publisher timer 279. After publishing the aggregated flow group records (and, in some embodiments, receiving confirmation that the records were received), the records stored for the previous publishing time period are deleted and a new set of aggregated flow group records are generated.

In some embodiments, one of the flow aggregator 277 and the context engine 210 performs another correlation operation to associate the sets of correlated contextual attributes stored in contextual attribute storage 245 with the aggregated flow group records stored in the flow group record storage 278. In some embodiments, the correlation includes generating new flow attribute sets with additional attribute data included in existing attribute fields or appended in new attribute fields. In other embodiments, the sets of correlated contextual attributes and aggregated flow group records are tagged to identify related sets of aggregated flow group records and contextual attribute data. In some embodiments, the generated new flow group records are published from one of the publishers (e.g., flow group record publisher 280 or context publisher 247). In other embodiments, flow group record publisher 280 publishes the tagged aggregated flow group records and the context publisher 247 publishes the tagged sets of correlated contextual attributes.

The anomaly detection engine 222, in some embodiments, receives flow data (from any of flow identifier and statistics storage 272, FIFO storage 275, or flow group record storage 278) and context data from context engine 210 and detects, based on the received data, anomalous behavior associated with the flows. For example, based on context data identifying the application or process associated with a flow, anomaly detection engine 222 determines that the source port is not the expected source port and is flagged as anomalous. The detection, in some embodiments, includes stateful detection, stateless detection, or a combination of both. Stateless detection does not rely on previously collected data at the host, while stateful detection, in some embodiments, maintains state data related to flows and uses the state data to detect anomalous behavior. For example, a value for a mean round trip time (RTT) or other attribute of a flow and a standard deviation for that attribute may be maintained by anomaly detection engine 222 and compared to values received in a current set of flow data to determine that the value deviates from the mean value by a certain number of standard deviations that indicates an anomaly. In some embodiments, anomaly detection engine 222 appends a field to the set of context data that is one of a flag bit that indicates that an anomaly was detected or an anomaly identifier field that indicates the type of anomaly detected (e.g., a change in the status of a flow from allowed to blocked [or vice versa], a sloppy or incomplete TCP header, an application/port mismatch, or an insecure version of an application). In some embodiments, the additional context data is provided to context engine 210 separately to be correlated with the other context data received at context engine 210. As will be understood from the discussion above, the anomaly detection process may use contextual attributes not in L2-L4 headers such as data included in L7 headers and additional context values not found in headers.

In some embodiments, the anomaly detection engine 222 takes an action or generates a suggestion based on detecting the anomaly. For example, anomaly detection engine 222 can block an anomalous flow pending user review or suggest that a new firewall rule be added to a firewall configuration. In some embodiments, the anomaly detection engines 222 on each host computer 200 can report these anomalies (e.g., via the context publisher 247) to the analysis appliance for further analysis by the anomaly processing engine.

The machine learning engine 224, in some embodiments, receives flow data (from any of the flow identifier and statistics storage 272, the FIFO storage 275, and the flow group record storage 278) and context data from the context engine 210 and performs analysis on the received data. The received data (e.g., flow group records), in some embodiments, includes attributes normally recorded in a 5-tuple as well as additional L7 attributes and other contextual attributes such as user sid, process hash, URLs, appId, etc., that allow for better recommendations to be made (e.g., finer-grained firewall rules). In some embodiments, the analysis identifies possible groupings of DCNs 205 executing on the host computer 200. In some embodiments, the analysis is part of a distributed machine learning process, and the results are provided to the context engine 210 as an additional contextual attribute.

Figure 3:
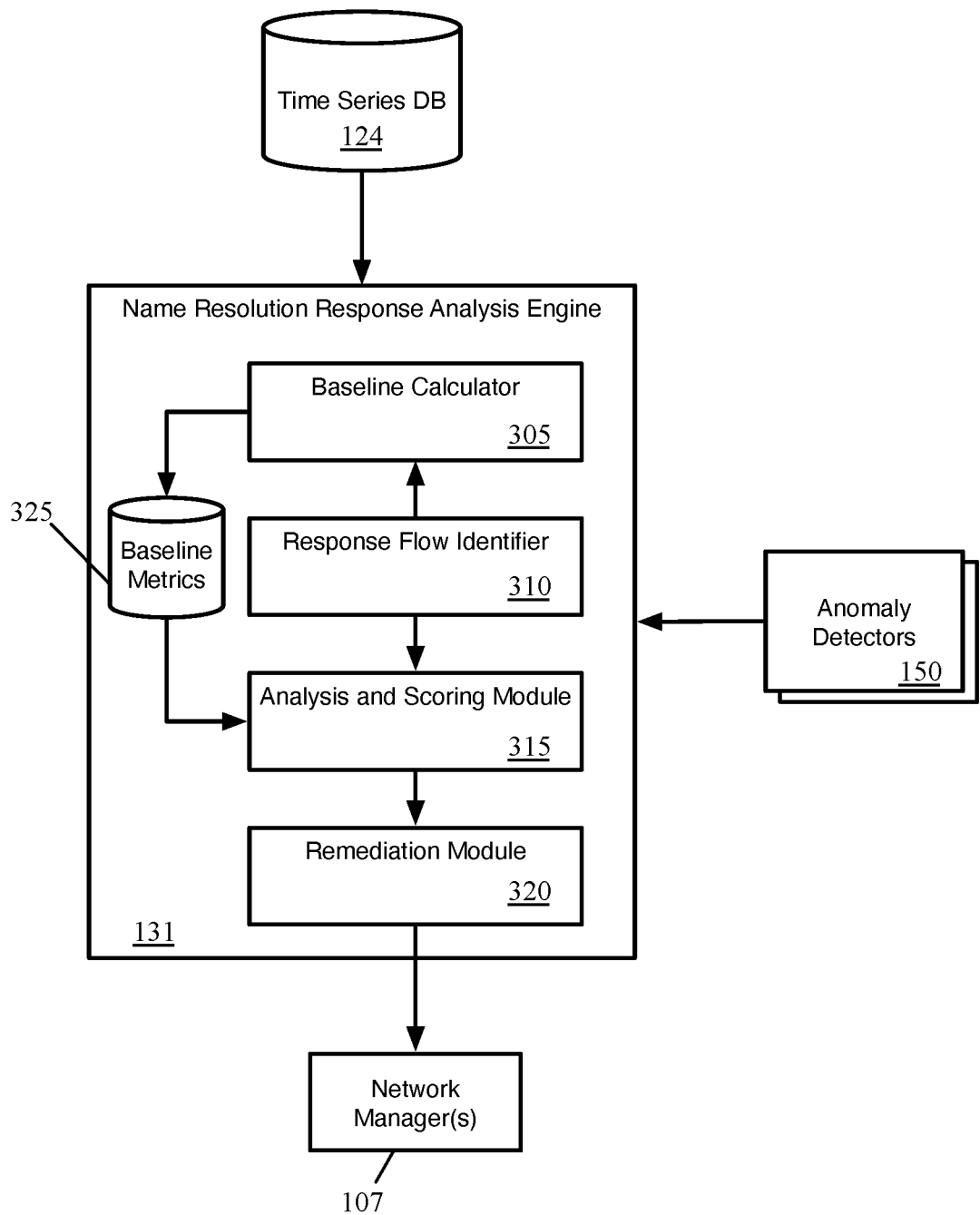
FIG. 3 conceptually illustrates details of the name resolution response analysis engine of some embodiments.

FIG. 3 conceptually illustrates additional details of the name resolution response analysis engine 131 of the analysis appliance 100 of some embodiments. As shown, the name resolution response analysis engine 131 includes a baseline calculator 305, a response flow identifier 310, an analysis and scoring module 315, and a remediation module 320. In addition, the name resolution response analysis engine 131 stores baseline metrics 325 that are calculated by the baseline calculator 305.

From the time series database 124, the name resolution response analysis engine 131 receives batches of flow attribute sets. These can include flow attribute sets from the last 30 days (or a similar baseline time period) for use by the baseline calculator 305 as well as flow attribute sets from only the current day (or current hour, etc., depending on the time period used for performing the analysis).

The response flow identifier 310 analyzes the flow attribute sets received by the name resolution response analysis engine 131 to identify flow attribute sets corresponding to name resolution responses. As described further below, in some embodiments this entails examining the flow attribute sets for flows having specific destination addresses and/or destination port numbers in order to find name resolution requests, and then searching for any name resolution responses sent in response to these requests. The response flow identifier 310 identifies these name resolution response flows both for the baseline time period as well as for the current time period (using similar methodologies on different groups of flow attribute sets at different time). The response flow identifier 310 provides the response flow information for the baseline time period to the baseline calculator 305 and for the current time period to the analysis and scoring module 315.

The baseline calculator 305 calculates baseline metrics 325 for each DCN of at least a set of DCNs operating in the datacenter and stores these baseline metrics for use in subsequent analysis. In some embodiments, these baseline metrics 325 are calculated over a baseline period (e.g., the previous 30 days) based on the response flow information identified by the response flow identifier 310, and the set of DCNs for which baseline metrics are calculated includes only those DCNs that have been operating for the entire baseline period. In other embodiments, the baseline calculator 305 also calculates baseline metrics for DCNs that have been operating for less than the baseline time period (e.g., any DCN operating for at least 3 days).

The baseline metrics 325 can include various metrics. For instance, the baseline calculator 305 of some embodiments calculates averages over the baseline period (e.g., a daily average over a 30-day baseline period) of the number of name resolution responses each DCN sent per time period (e.g., per day) and the number of unique DCNs to which each DCN sent name resolution responses per time period. The baseline calculator 305 of some embodiments also calculates, for each DCN, the ratio of name resolution responses sent to name resolution requests received during the baseline time period. In addition, in some embodiments the baseline calculator 305 generates lists, for each DCN of (i) all of the DCNs to which the DCN sent name resolution responses during the baseline time period and (ii) all of the names for which the DCN sent name resolution responses during the baseline time period.

The analysis and scoring module 315 performs the analysis to compare name resolution response flow information for the current time period (e.g., the current day) to the previously-calculated baseline metrics in order to identify potentially compromised DCNs in the datacenter. In some embodiments, the analysis and scoring module 315 compares (for each DCN) the number of name resolution responses sent during the current time period to the baseline average number of name resolution responses sent during such a time period within the baseline time period (e.g., the number of responses sent during the current day compared to the average number sent per day), the ratio of name resolution responses sent to name resolution requests received during the current time period to the equivalent ratio during the baseline time period, and the number of unique DCNs to which name resolution responses were sent during the current time period to the number of unique DCNs to which name resolution responses were sent during the baseline time period. For each of these comparisons, generally, exceeding the calculated baseline is potentially indicative of a DCN being compromised, and exceeding the calculated baseline by larger amounts makes the DCN being compromised more likely. The analysis and scoring module also, in some embodiments, identifies the number of new DCNs to which the DCN sent name resolution responses during the current time period and the number of new names for which the DCN sent name resolution responses during the current time period (i.e., DCNs and names that were not on the baseline lists for the DCN). Based on these various metrics, and possibly incorporating any other anomalous events received from the anomaly detectors 150, the analysis and scoring module 315 generates a score for each DCN indicating the likelihood that the DCN is compromised. Scores above a threshold indicate that the DCN is likely compromised, and the remediation module 320 is informed of the DCNs and their scores.

The remediation module 320, in some embodiments, initiates remediation actions (e.g., by communicating with the network manager(s) 107). In some embodiments, higher scores result in more aggressive remediation actions. For instance, for a first tier of potential threats (e.g., DCNs having scores above a first threshold), the remediation module generates and provides to the network managers 107 firewall rules that prevent the DCNs from receiving name resolution requests. For a second tier of such potential threats (e.g., DCNs having scores above a higher second threshold), the remediation module generates and provides to the network managers 107 firewall rules that more fully quarantine the DCNs by, e.g., preventing the DCNs from sending and/or receiving any network traffic or setting up any network connections.

Figure 4:
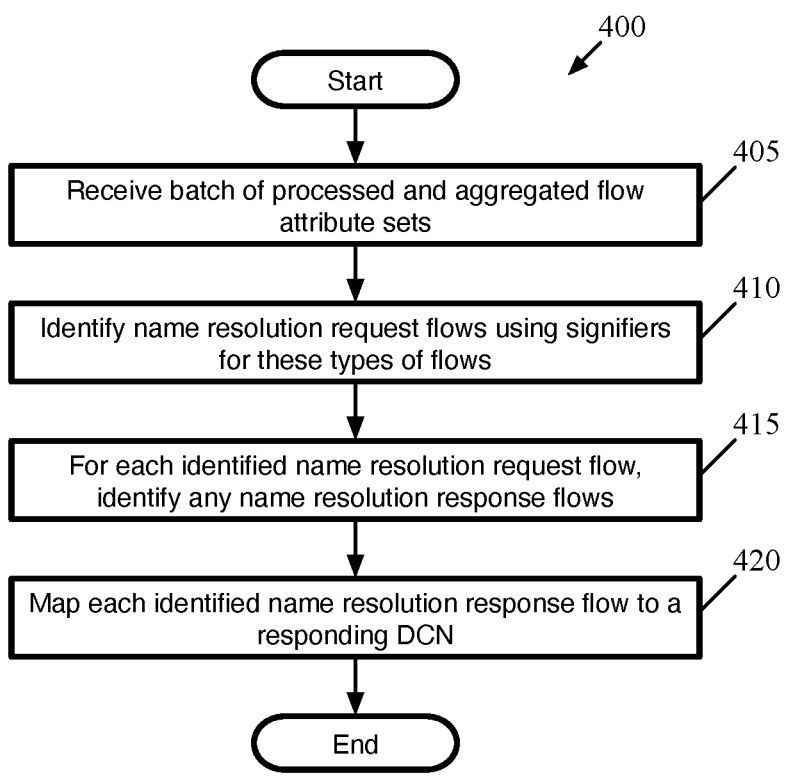
FIG. 4 conceptually illustrates a process of some embodiments for identifying flow attribute sets corresponding to name resolution response flows.

As indicated above, the name resolution response analysis engine of some embodiments identifies flow attribute sets corresponding to name resolution responses (i.e., responses to name resolution requests) sent by DCNs within the datacenter network, then uses these identified flow attribute sets to perform its analysis. FIG. 4 conceptually illustrates a process 400 of some embodiments for identifying flow attribute sets corresponding to name resolution response flows. In some embodiments, the process 400 is performed by the response flow identifier 310 upon receiving a batch of flow attribute sets from the time series database (or processing pipeline) of the analysis appliance.

As shown, the process 400 begins by receiving (at 405) a batch of processed and aggregated flow attribute sets. As noted, in some embodiments these flow attribute sets are retrieved from the time series database and may have been collected during a particular time period. If the name resolution response analysis engine is currently generating baseline metrics (e.g., at the beginning of a day, to calculate new metrics for the most recent 30-day period), then the flow attribute sets were collected during the baseline time period. If baseline metrics have already been calculated and the name resolution response analysis engine is currently calculating threat likelihood scores, then the flow attribute sets were collected during the current time period for analysis (e.g., the current day). Each flow attribute set indicates at least source and destination network addresses (e.g., IP addresses), a transport layer protocol, and source and destination transport layer port numbers, information which can be used to identify the name resolution request and response flows. For name resolution requests and responses, each of the flow attribute sets (or additional data mapped to the flow attribute sets) typically also includes information about the message itself, such as the name for which a network address is being requested (or sent).

The process 400 then identifies (at 410) name resolution request flows using signifiers for these types of flows. For instance, LLMNR request flows (i) are user datagram protocol (UDP) flows, (ii) are addressed to the same multicast IP address (224.0.0.252), and (iii) have the same destination transport layer port (5355). NBT-NS request flows (i) are also UDP flows, (ii) are addressed to a multicast IP address (e.g., 192.168.1.255), and (iii) have the same destination transport layer port (137). Thus, any flows that match either of these sets of criteria can be identified as name resolution request flows.

Figure 5:
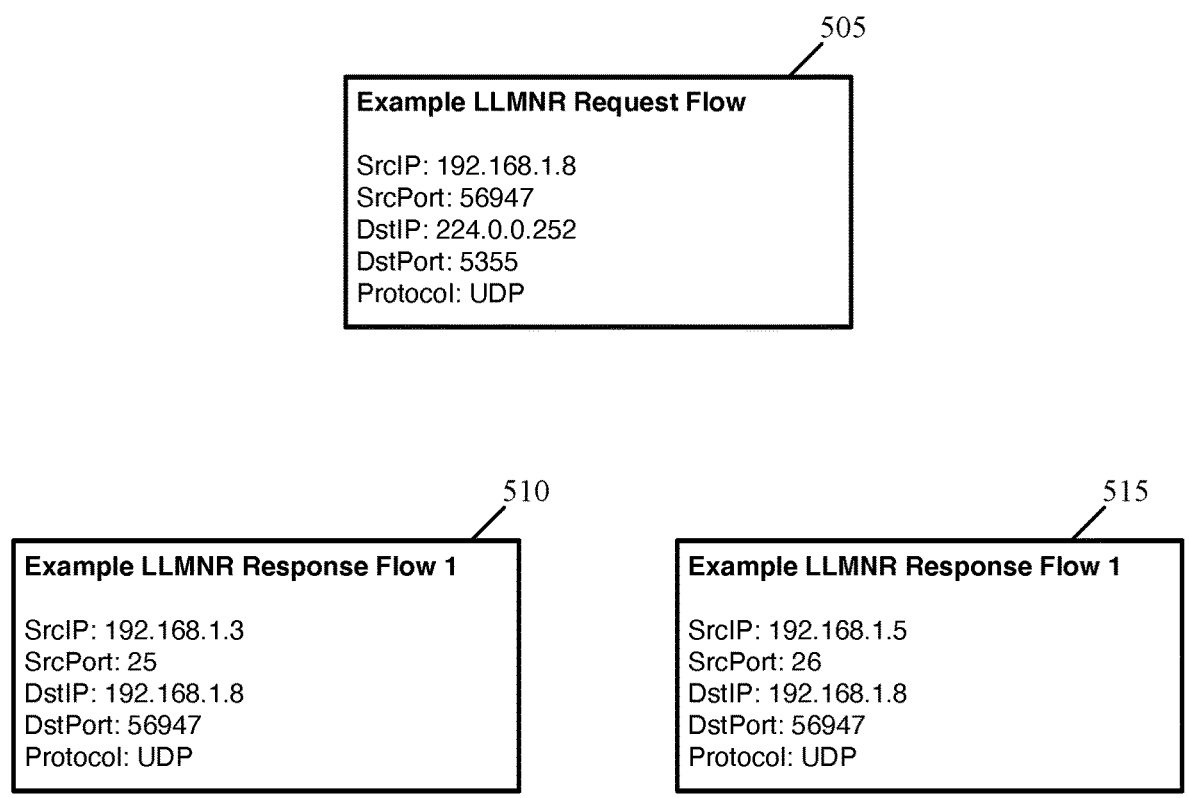
FIG. 5 conceptually illustrates an example of an LLMNR request flow and two corresponding LLMNR response sent by different responders.

Next, for each identified name resolution request flow, the process 400 identifies any name resolution response flows. Because the name resolution requests are sent out as multicast messages (on a physical network or a logical network), the requesting DCN may receive name resolution responses from multiple responder DCNs. In general, the requesting DCN uses the first response received. LLMNR response flows typically are (i) UDP flows, (ii) are sent to a destination network address that matches the source network address of the identified request flow, and (iii) have a destination port number that matches the source port number of the identified request flow. In addition, of course, the response flow should have a timestamp from a short time after the request flow. FIG. 5 conceptually illustrates an example of an LLMNR request flow 505 and two corresponding LLMNR response flows 510 and 515 sent by different responders. The request flow 505 is a UDP flow with a source IP address of 192.168.1.8, a source port of 56947, a destination IP address of 224.0.0.252, and a destination port of 5355. Based on the protocol, destination IP address, and destination port, this can be identified as a name resolution request flow. Each of the response flows 510 and 515 are UDP flows with destination IP addresses of 192.168.1.8 and destination ports of 56947, matching the source IP address and source port of the request flow, so they are each identified as name resolution response flows. The two response flows are sent from different source IP addresses and use different source ports (the source port on the responses can be ignored, in some embodiments).

Figure 6:
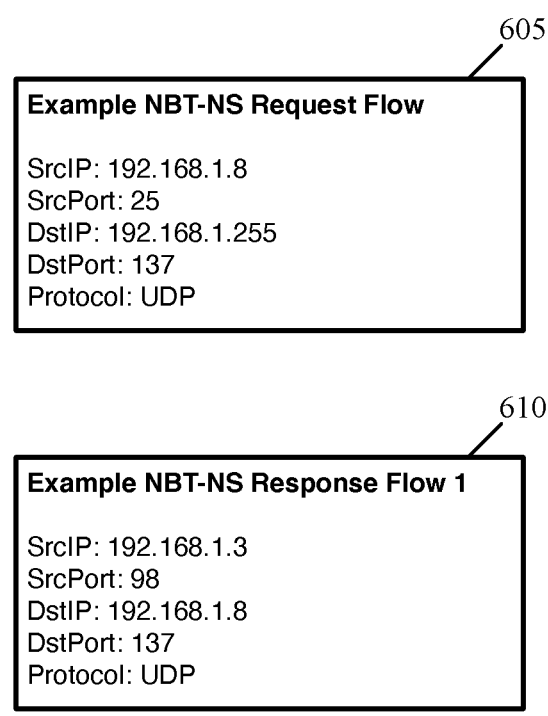
FIG. 6 conceptually illustrates an example of an NBT-NS request flow and a corresponding NBT-NS response flow.

NBT-NS response flows typically are (i) UDP flows, (ii) are sent to a destination network address that matches the source network address of the identified request flow, and (iii) have the same destination port number (137, the same port number used for request flows). FIG. 6 conceptually illustrates an example of an NBT-NS request flow 605 and a corresponding NBT-NS response flow 610. The request flow 605 is a UDP flow with a source IP address of 192.168.1.8, a source port of 25, a destination IP address of 192.168.1.255, and a destination port of 137. Based on the protocol, destination IP address, and destination port, this can be identified as a name resolution request flow. The response flow 610 is a UDP flow with a destination IP address of 192.168.1.8 (matching the source IP address of the request flow) and a destination port of 137 (the port used for all NBT-NS requests and responses), so this is identified as a name resolution response flow. The source port for both messages can be ignored for NBT-NS messages in some embodiments.

Finally, the process 400 maps (at 420) each of the identified name resolution response flows to a responding DCN. In some embodiments, the name resolution response analysis engine uses the source IP address of the response flow to identify the responder DCN. In other embodiments, the analysis appliance performs this analysis as part of the flow attribute set aggregation and processing prior to storing the flow attribute sets in the time series database (which can be necessary when a datacenter includes many logical networks with overlapping network addresses spaces). In the latter case, the flow attribute set specifies a source DCN for the flow (e.g., using a unique (to the datacenter) identifier for the DCN. In this case, the name resolution response analysis engine just aggregates the response flows by responder DCN.

Figure 7:
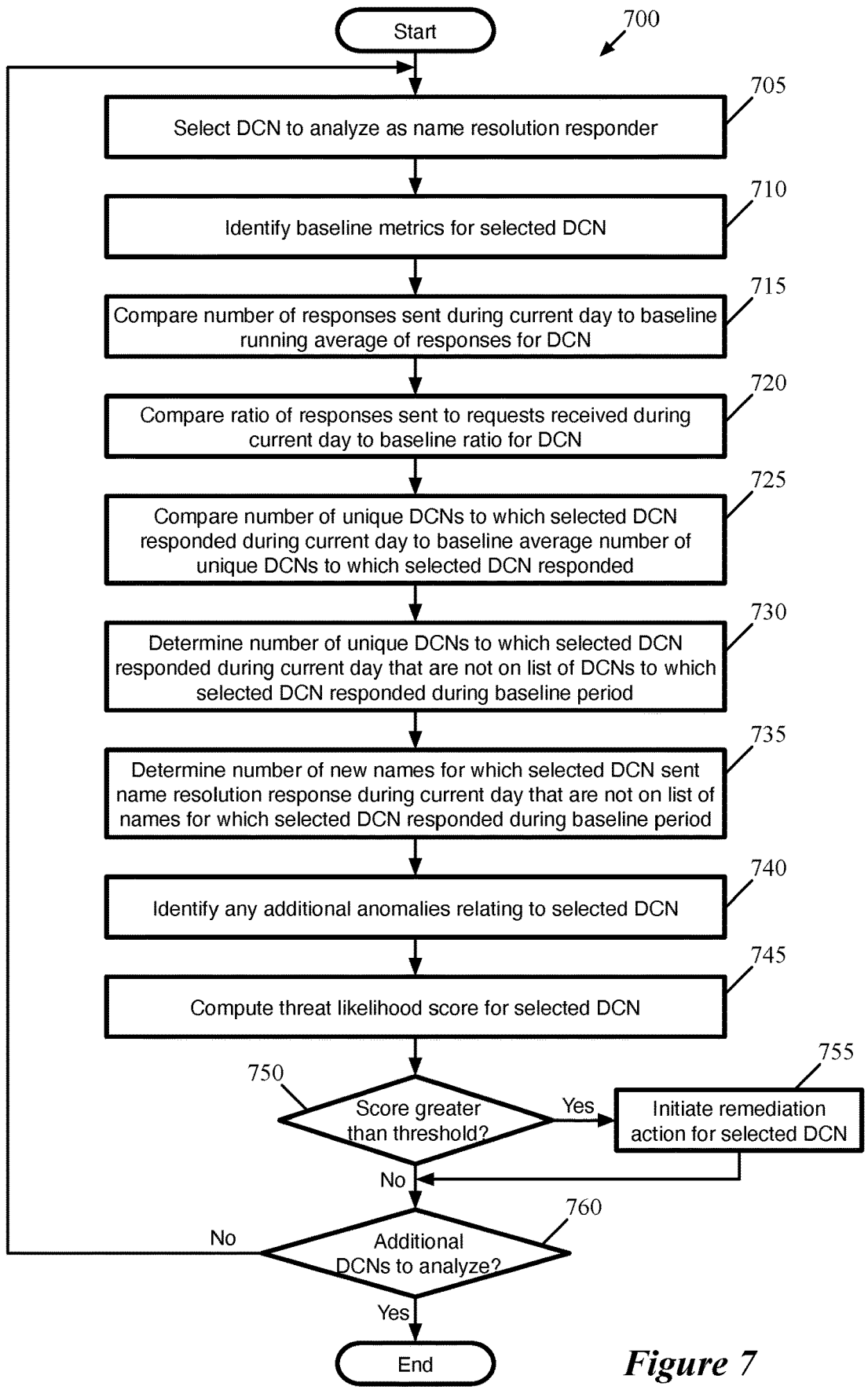
FIG. 7 conceptually illustrates a process of some embodiments for performing analysis to identify compromised DCNs.

As noted above, the name resolution response analysis engine of some embodiments analyzes each DCN of at least a subset of DCNs in a datacenter on a regular basis to determine the likelihood that the DCN has been compromised and is attempting to capture authentication information by spoofing name resolution responses. FIG. 7 conceptually illustrates a process 700 of some embodiments for performing analysis to identify compromised DCNs. In some embodiments, the name resolution response analysis engine performs the process 700 or a similar process on a regular basis (e.g., every 10 minutes). In datacenters where name resolution protocols are more widely used, this regular time can be decreased so that the threats are detected more quickly.

As shown, the process 700 begins (at 705) by selecting a DCN to analyze as a name resolution responder. The DCNs are analyzed based on how often they respond to name resolution requests; how often the DCNs initiate such requests is not of concern because these requests are typically benign. It should be noted that the process 700 is a conceptual process that performs analysis on each DCN serially. In practice, the name resolution response analysis engine of some embodiments actually performs analysis on many DCNs in parallel (e.g., performing the operations of the process 700 in parallel for each of these DCNs).

The process 700 identifies (at 710) baseline metrics for the selected DCN. In some embodiments, the baseline metrics for each DCN to be analyzed are calculated at the beginning of a time period and stored until they need to be updated. For instance, if a 30-day baseline period is used and this changes each day, then the baseline metrics are recalculated at the beginning of each day and stored for the entire day. The same baseline metrics are then used each time the name resolution response analysis engine performs its analysis (e.g., every 10 minutes).

Next, the process 700 performs a number of comparisons of the current time period metrics to the baseline metrics. It should be understood that, while the process 700 shows a specific set of comparisons being performed in a particular order, other embodiments may perform the comparisons in a different order, may perform fewer, additional, or different comparisons, may perform the comparisons in parallel, etc. Each of the metrics has both upsides and downsides, and thus the combination of metrics is used to arrive at a score. In addition, the process 700 uses the current day as the current time period, but the current time period could be a different length of time period in other embodiments (e.g., the current week, current hour, etc.). In the case of a different time period length, the baseline averages would be averaged over equivalent time periods (e.g., for a current time period of the current hour, an hourly average from the past 24 or 48 hours might be used instead of a 30-day daily average).

The process 700 compares (at 715) the number of name resolution responses sent during the current day to the baseline running average of responses sent per day for the DCN. In general, an increase in the overall number of name resolution responses sent compared to the average can potentially be indicative of anomalous behavior. However, in some cases an increase in the number of responses sent by a DCN could just be due to an increase in the number of requests received by the DCN.

Thus, the process 700 also compares (at 720) the ratio of name resolution responses sent to name resolution requests received during the current day to the equivalent ratio over the baseline time period. This will generally have fewer false positives than the first metric, because it does not depend on the number of name resolution requests any given DCN receives. However, the ratio could still vary based on which DCNs are sending the name resolution requests and for which names the requests are sent during the current time period.

As such, the process 700 also compares (at 725) the number of unique DCNs to which the selected DCN responded during the current day to the average number of unique DCNs to which the selected DCN responded during the baseline period. This comparison provides additional context in that a selected DCN might be responding to more of the received name resolution requests than usual because a particular DCN to which it usually responds has sent out a larger than usual number of requests. However, if the selected DCN receives requests from a larger than usual number of DCNs, then this comparison could be skewed to produce a false positive without additional context.

For more specific comparisons, the process 700 also determines (at 730) the number of unique DCNs to which the selected DCN sent a name resolution response during the current day that are not on the list of DCNs to which the selected DCN responded during the baseline period. Responding to new DCNs is a good sign that the selected DCN is compromised, as a compromised DCN will often try to respond to as many name resolution requests as possible in order to collect authentication information from those DCNs. However, if a new DCN sends a name resolution request, that could create a false positive. Furthermore, if the selected DCN regularly responds to all of the DCNs in its multicast group, this will not pick up the DCN being compromised.

For even further context, the process 700 of some embodiments determines (at 735) the number of new names for which the selected DCN has sent a name resolution response during the current day that are not on a list of names for which the selected DCN sent any responses during the baseline period. Using this metric helps avoid false positives due to large numbers of requests for a single name for which the selected DCN has commonly sent name resolution responses. However, if the naming scheme in the subnet to which the selected DCN belongs, this can still create false positives. Furthermore, using this metric requires additional processing either at the host computers or by the analysis appliance in order to identify this information from the name resolution request and/or response messages.

In some embodiments, the process 700 also identifies (at 740) any additional anomalies related to the selected DCN. In some embodiments, other anomaly detectors within the analysis appliance perform real-time and/or batch processing to detect various different types of anomalies, some of which can be useful in detecting a name resolution response attack. For instance, some embodiments model an outgoing connection pattern for each DCN and use this to identify anomalous outgoing connections. While this does not on its own indicate a name resolution response attack, it can be used in combination with the other metrics to strengthen the case that the DCN is compromised.

Based on all of these various metrics (or a different combination of metrics), the process 700 computes (at 745) a threat likelihood score for the selected DCN. In different embodiments, the threat likelihood score computation for a DCN is based on different combinations of the various metrics analyzed for the DCN. For instance, some embodiments use a weighted computation that assigns a normalized score for each metric and computes a weighted sum of the normalized scores. The metrics measuring deviation from an average might be scored in terms of number of standard deviations above the average, while the metrics measuring unique new DCNs to which the selected DCN responds or unique new names for which responses are sent might be scored based on an absolute number of new DCNs or names. The weighted sum allows for metrics to be assigned more importance than others (e.g., responding to a new unique name might be considered more important than the change in response to request ratio). In some embodiments, specific combinations can be multiplicative in the score computation, so that one is more important when the other is also high. For instance, an increase in response to request ratio might not mean as much on its own, but in combination with an increase in the number of unique VMs to which the selected DCN responds the increase in the ratio is more indicative of a likely compromised DCN.

Figure 8:
FIG. 8 conceptually illustrates a table with different metrics for two different VMs giving rise to different scores.

FIG. 8 conceptually illustrates a table 800 with different metrics for two different VMs giving rise to different scores. As shown, a first VM slightly exceeds its 30-day average of number of name resolution responses sent during the current day (6 compared to the usual 5), significantly increases its response to request ratio (4% to 10%), responds to one more DCN than usual (3 compared to the average of 2), responds to a single new DCN, and does not send responses for any new names. Because the increases are mostly minor except for a significant increase in response to request ratio (e.g., because more requests might have been from a single DCN), the score is relatively low (15 on a 100-point scale). The second VM exceeds its 30-day average of number of name resolution responses sent during the current day (12 compared to the usual 9), also significantly increases its response to request ratio (5% to 12%), responds to two more DCNs than usual (5 compared to the average of 3), also responds to a single new DCN, and sends responses many new names (5). Especially given the number of new names to which this VM responds, the score for the VM is fairly high (65).

Next, the process 700 determines (at 750) whether the computed score for the selected DCN is greater than a threshold score. DCNs with scores below the threshold are considered unlikely to be compromised (or at least unlikely to be undertaking an attack using name resolution responses). On the other hand, DCNs with scores above the threshold are considered at least reasonably likely to be carrying out such an attack. In some embodiments, this threshold score can be set by a user of the analysis appliance (e.g., a network or security administrator).

If the score for the selected DCN is above the threshold, the process initiates (at 755) a remediation action for the selected DCN. In some embodiments, initiating remediation actions entails generating a firewall rule or set of firewall rules and providing these rules to the network managers and/or network controllers so that the network management and control system can automatically configure the network elements to implement the firewall rules. In other embodiments, another entity (e.g., the network managers themselves) generate the firewall rules based on notification of the detected anomaly (that the selected DCN is likely compromised).

In some embodiments, the specific remediation actions taken depend on the score, with higher scores resulting in more aggressive remediation actions. For instance, for a first tier of potential threats (e.g., DCNs with scores above the threshold for remediation but below a second threshold), the name resolution response analysis module generates a firewall rule that prevents the DCNs from receiving name resolution requests, so that this specific type of attack can no longer be carried out. For a second tier of such threats (e.g., DCNs with scores above the second threshold, the analysis appliance more fully quarantines the DCNs. This might entail preventing the DCNs from sending and/or receiving any network traffic or setting up any network connections. In addition, some embodiments generate an alert so that the issue is brought to the attention of an administrator, who can then determine whether or not the DCN is not actually compromised. In some embodiments, the administrator determination generates feedback that affects the scoring computation (such that metrics leading to false positives are reduced in importance and metrics leading to accurate threat determinations are increased in importance).

Figure 9:
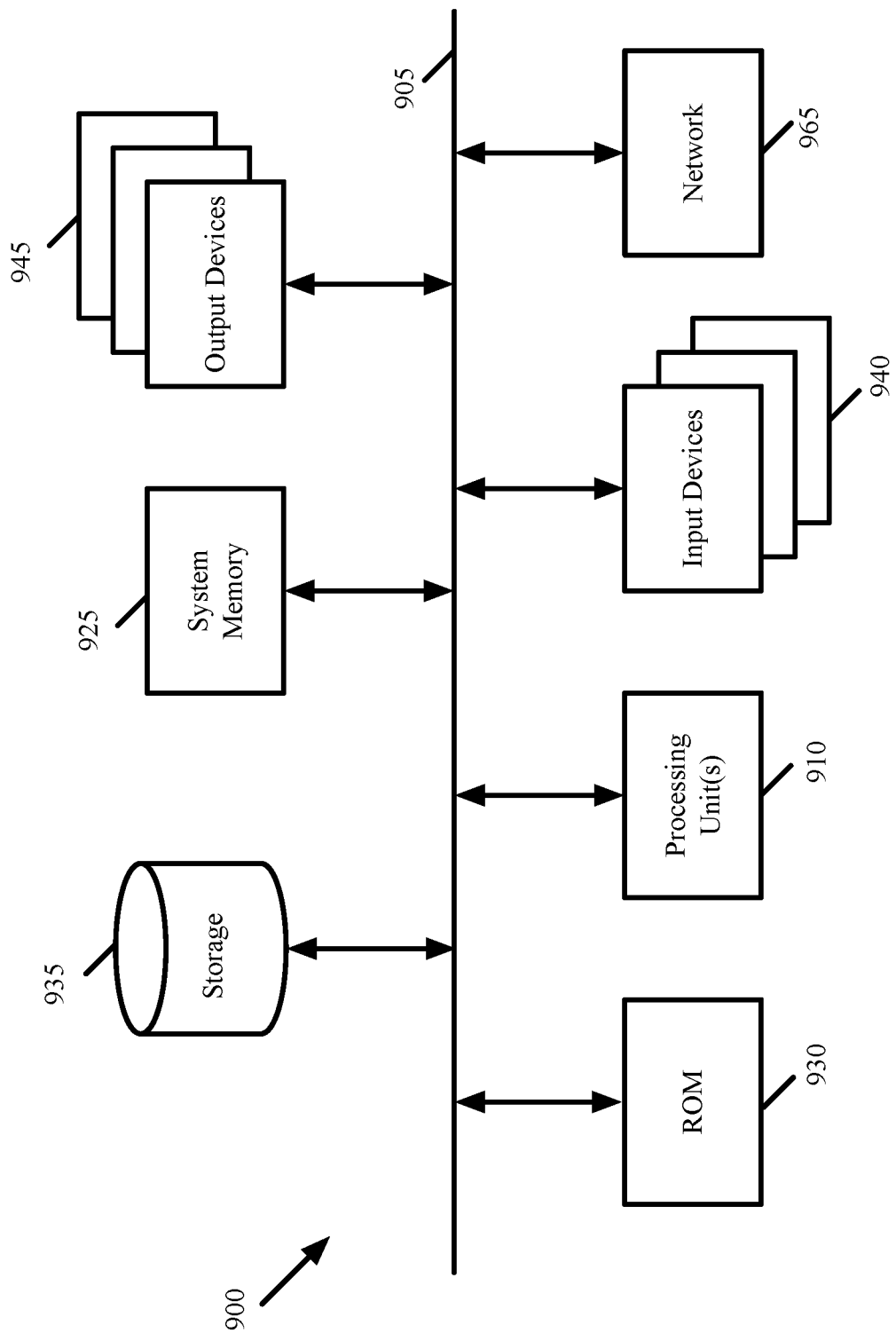
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random-access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 4 and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for identifying security threats to a datacenter, the method comprising: receiving flow attribute sets for a plurality of flows from a plurality of host computers in the datacenter on which data compute nodes (DCNs) execute, each flow attribute set indicating at least a source DCN for the flow; identifying flow attribute sets that correspond to DCNs responding to name resolution requests, wherein (i) each respective name resolution request specifies a respective name having a respective corresponding network address that is unknown to a sender of the request and (ii) each respective name resolution response provides the respective corresponding network address of the responding DCN; for each DCN of a set of DCNs executing on the host computers, (i) identifying a metric related to a number of responses that the DCN has sent to name resolution requests during a time period and (ii) based on this metric, determining whether the DCN has sent responses to name resolution requests in a manner that deviates from a historical baseline for the DCN based on the identified flow attribute sets; and when a particular DCN has sent responses to name resolution requests in a manner that deviates from a historical baseline for the particular DCN, identifying the particular DCN as a security threat to the datacenter.

2. The method of claim 1, wherein the time period is a first recent time period, wherein the metric comprises a comparison of name resolution responses sent by the particular DCN during the first recent time period to name resolution responses sent by the particular DCN during a second historical time period.

3. The method of claim 2, wherein the first recent time period is a most recent day and the second time period comprises a plurality of days prior to the most recent day.

4. The method of claim 1, wherein the name resolution requests comprise at least one of (i) Link-Local Multicast Name Resolution (LLMNR) requests and (ii) NetBIOS Name Service (NBT- NS) requests.

5. The method of claim 1, wherein identifying flow attribute sets that correspond to the DCNs responding to name resolution requests comprises identifying pairs of name resolution request flows and corresponding name resolution response flows.

6. The method of claim 1, wherein the time period is a recent time period, wherein the metric comprises a comparison an average number of name resolution responses sent by the particular DCN during a plurality of historical time periods to a number of name resolution responses sent by the particular DCN during the recent time period.

7. The method of claim 1, wherein the time period is a recent time period, wherein the metric comprises a comparison of an average ratio of name resolution requests received to name resolution responses sent by the particular DCN during a plurality of historical time periods to a ratio of name resolution requests received to name resolution responses sent by the particular DCN during the recent time period.

8. The method of claim 1, wherein the time period is a recent time period, wherein the metric comprises a comparison of an average number of unique DCNs to which the particular DCN sends name resolution responses during a plurality of historical time periods to a number of unique DCNs to which the particular DCN sends name resolution responses during a recent time period.

9. The method of claim 1, wherein the time period is a recent time period, wherein the determination that the particular DCN has sent responses to name resolution requests in a manner that deviates from the historical baseline is further based on whether the particular DCN has sent name resolution responses to any DCNs during a recent time period that are not on a list of DCNs to which the particular DCN sent name resolution responses during a historical time period.

10. The method of claim 1, wherein the time period is a recent time period, wherein the determination that the particular DCN has sent responses to name resolution requests in a manner that deviates from the historical baseline is further based on whether the particular DCN has sent name resolution responses for any names during a recent time period that are not on a list of names for which the particular DCN sent name resolution responses during a historical time period.

11. The method of claim 1, wherein the time period is a recent time period, wherein determining whether the particular DCN has sent responses to name resolution requests in a manner that deviates from the historical baseline comprises comparing a plurality of metrics from a recent time period, including the metric related to a number of responses that the DCN has sent to name resolution requests during the recent time period, to the plurality of metrics for a historical time period in order to determine a score.

12. A method for identifying security threats to a datacenter, the method comprising: receiving flow attribute sets for a plurality of flows from a plurality of host computers in the datacenter on which data compute nodes (DCNs) execute, each flow attribute set indicating at least a source DCN for the flow; identifying flow attribute sets that correspond to DCNs responding to name resolution requests, each response to a name resolution request providing a network address of the responding DCN; for each DCN of a set of DCNs executing on the host computers, determining whether the DCN has sent responses to name resolution requests in a manner that deviates from a historical baseline for the DCN based on the identified flow attribute sets; and when a first DCN has sent responses to name resolution requests in a manner that deviates from a historical baseline for the first DCN, identifying the first DCN as a security threat to the datacenter, wherein the first DCN provides an incorrect network address to a second DCN that allows the first DCN to capture authentication information from the second DCN.

13. The method of claim 12, wherein identifying the first DCN as a security threat comprises determining that an outgoing connection pattern for the first DCN is anomalous.

14. The method of claim 12 further comprising generating and deploying a firewall rule that blocks the first DCN from receiving name resolution requests based on the identification of the first DCN as a security threat.

15. The method of claim 12 further comprising quarantining the first DCN to prevent the first DCN from communicating with other DCNs in the datacenter.

16. The method of claim 12, wherein each respective name resolution request is sent by a respective DCN and specifies a respective name with a respective corresponding network address that is unknown to the respective DCN, wherein the responses provide the respective corresponding network address.

17. A non-transitory machine-readable medium storing a program which when executed by at least one processing unit identifies security threats to a datacenter, the program comprising sets of instructions for: receiving flow attribute sets for a plurality of flows from a plurality of host computers in the datacenter on which data compute nodes (DCNs) execute, each flow attribute set indicating at least a source DCN for the flow;
identifying flow attribute sets that correspond to DCNs responding to name resolution requests; and for each DCN of a set of DCNs executing on the host computers, determining whether the DCN has sent responses to name resolution requests in a manner that deviates from a historical baseline for the DCN based on the identified flow attribute sets; and when a particular DCN has sent responses to name resolution requests in a manner that deviates from a historical baseline for the particular DCN, identifying the particular DCN as a security threat to the datacenter.

18. The non-transitory machine-readable medium of claim 17, wherein the set of instructions for identifying flow attribute sets that correspond to the DCNs responding to name resolution requests comprises a set of instructions for identifying pairs of name resolution request flows and corresponding name resolution response flows.

19. The non-transitory machine-readable medium of claim 17, wherein the set of instructions for determining whether the particular DCN has sent responses to name resolution requests in a manner that deviates from the historical baseline comprises a set of instructions for comparing name resolution responses sent by the particular DCN during a first recent time period to name resolution responses sent by the particular DCN during a second historical time period.

20. The non-transitory machine-readable medium of claim 17, wherein the set of instructions for determining whether the particular DCN has sent responses to name resolution requests in a manner that deviates from the historical baseline comprises a set of instructions for comparing an average number of name resolution responses sent by the particular DCN during a plurality of historical time periods to a number of name resolution responses sent by the particular DCN during a recent time period.

21. The non-transitory machine-readable medium of claim 17, wherein the set of instructions for determining whether the particular DCN has sent responses to name resolution requests in a manner that deviates from the historical baseline comprises a set of instructions for comparing an average ratio of name resolution requests received to name resolution responses sent by the particular DCN during a plurality of historical time periods to a ratio of name resolution requests received to name resolution responses sent by the particular DCN during a recent time period.

22. The non-transitory machine-readable medium of claim 17, wherein the set of instructions for determining whether the particular DCN has sent responses to name resolution requests in a manner that deviates from the historical baseline comprises a set of instructions for comparing an average number of unique DCNs to which the particular DCN sends name resolution responses during a plurality of historical time periods to a number of unique DCNs to which the particular DCN sends name resolution responses during a recent time period.

23. The non-transitory machine-readable medium of claim 17, wherein the set of instructions for determining whether the particular DCN has sent responses to name resolution requests in a manner that deviates from the historical baseline comprises a set of instructions for determining whether the particular DCN has sent name resolution responses to any DCNs during a recent time period that are not on a list of DCNs to which the particular DCN sent name resolution responses during a historical time period.

24. The non-transitory machine-readable medium of claim 17, wherein the set of instructions for determining whether the particular DCN has sent responses to name resolution requests in a manner that deviates from the historical baseline comprises a set of instructions for determining whether the particular DCN has sent name resolution responses for any names during a recent time period that are not on a list of names for which the particular DCN sent name resolution responses during a historical time period.

25. The non-transitory machine-readable medium of claim 17, wherein the set of instructions for determining whether the particular DCN has sent responses to name resolution requests in a manner that deviates from the historical baseline comprises a set of instructions for comparing a plurality of metrics from a recent time period to the plurality of metrics for a historical time period to determine a score.

* * * * *